(12) United States Patent
Rekimto et al.

(10) Patent No.: US 9,298,977 B2
(45) Date of Patent: Mar. 29, 2016

(54) INFORMATION PROCESSING DEVICE, INFORMATION PROCESSING METHOD, AND PROGRAM FOR RECOGNIZING FACIAL EXPRESSION AND PERMITTING USE OF EQUIPMENT BASED ON THE RECOGNIZED FACIAL EMOTION EXPRESSION

(75) Inventors: Junichi Rekimto, Kanagawa (JP); Hitomi Tsujita, Chiba (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 13/363,799

(22) Filed: Feb. 1, 2012

(65) Prior Publication Data

US 2012/0206603 A1 Aug. 16, 2012

(30) Foreign Application Priority Data

Feb. 10, 2011 (JP) .................. 2011-027680

(51) Int. Cl.
*H04N 7/18* (2006.01)
*G06K 9/00* (2006.01)

(52) U.S. Cl.
CPC .................. *G06K 9/00308* (2013.01)

(58) Field of Classification Search
CPC .................................. G06K 9/00308
USPC ....................................... 348/156
See application file for complete search history.

(56) References Cited

U.S. PATENT DOCUMENTS

| | | | |
|---|---|---|---|
| 2007/0009139 A1* | 1/2007 | Landschaft et al. | 382/115 |
| 2010/0005393 A1* | 1/2010 | Tokashiki et al. | 715/716 |
| 2012/0075452 A1* | 3/2012 | Ferren | 348/78 |

FOREIGN PATENT DOCUMENTS

| | | |
|---|---|---|
| JP | 2009-290819 | 12/2009 |
| JP | 2010-034686 | 2/2010 |

OTHER PUBLICATIONS

James; "The Principles of Psychology", vol. 2, 1950, New York, Dover Publications (the original work was published in 1890), pp. 1-25, (1950).

Kleinke et al.; "Effects of Self-Generated Facial Expressions on Mood", Journal of Personality and Social Psychology, vol. 74, No. 1, pp. 272-279, (1998).

* cited by examiner

*Primary Examiner* — Dave Czekaj
*Assistant Examiner* — Leron Beck
(74) *Attorney, Agent, or Firm* — Paratus Law Group, PLLC

(57) ABSTRACT

An information processing device includes a recognition unit which recognizes a facial expression of a user taken on a captured image, and a control unit which controls equipment to permit the user to use the equipment when the facial expression recognized by the recognition unit is a specific facial expression.

14 Claims, 15 Drawing Sheets

| 1 | | 101 |
|---|---|---|
| INFORMATION PROCESSING DEVICE | → | CONTROL TARGET EQUIPMENT |

INFORMATION PROCESSING DEVICE, INFORMATION PROCESSING METHOD, AND PROGRAM FOR RECOGNIZING FACIAL EXPRESSION AND PERMITTING USE OF EQUIPMENT BASED ON THE RECOGNIZED FACIAL EMOTION EXPRESSION

BACKGROUND

The present disclosure relates to an information processing device, an information processing method, and a program, and particularly, an information processing device, an information processing method, and a program which are designed to make a user actively have a specific facial expression.

As the quoted statement (The Principles of Psychology (Vol. 2), 1950, New York, Dover Publications (the original work was published in 1890)) of William James, there is the belief that "We do not laugh because we are happy—we are happy because we laugh". Recent studies have also acquired an abundance of ideas that support the belief.

For example, the experiment of Kleinke, et al. disclosed in "Effects of Self-Generated Facial Expressions on Mood" (by Chris L. Kleinke, Thomas R. Peterson, and Thomas R. Rutledge, Journal of Personality and Social Psychology 1998, Vol. 74, No. 1,272,279) verified whether or not there is a difference in facial expressions between a subject group in which photos of various facial expressions (laughing and sad) are shown to subjects and the subjects are instructed to make "the same facial expressions as in the photos" and the other subject group in which the photos are just shown to subjects. From the experiment, it was ascertained that the action of seeing a photo of a smiling face and then actually making such a smiling face contributes to making the emotion of a subject bright.

Japanese Unexamined Patent Application Publication Nos. 2010-34686 and 2009-290819 are example of related art.

SUMMARY

The above-described experiment disclosed in "Effects of Self-Generated Facial Expressions on Mood" indicates that there is a possibility that an emotional state of a person can be positive by making the person actively have a smiling face.

It is desirable for the disclosure to make a user actively have a specific facial expression.

According to an embodiment of the present disclosure, there is provided an information processing device which includes a recognition unit which recognizes a facial expression of a user taken on a captured image, and a control unit which controls equipment to permit the user to use the equipment when the facial expression recognized by the recognition unit is a specific facial expression.

It may be possible to set the specific facial expression to a smile. It is also possible to set the specific facial expression to a facial expression other than a smile such as an angry face, a weeping face, or the like. Equipment which it is permitted for the user to use includes not only electric appliances such as a television set, an audio player, a personal computer, a vacuum, a washing machine, a refrigerator, and the like, but also items such as a door, furniture, or the like, of which the operation is controlled.

It may be possible to further include a capturing unit which captures an image of the user. In this case, the recognition unit can recognize a facial expression of the user taken on the image captured by the capturing unit.

It may be possible to further include an output unit which outputs information indicating the specific facial expression when the specific facial expression is recognized by the recognition unit and outputs information indicating a different facial expression from the specific expression when the different facial expression that is not the specific expression is recognized by the recognition unit.

It is possible to output, for example, an image, a sound, light, or vibration as information indicating the specific facial expression. As information indicating the different facial expression from the specific expression, it is possible to output an image different from an image output as the information indicating the specific facial expression and a sound different from a sound output as the information indicating the specific facial expression. In addition, it is possible to output light different from light output as the information indicating the specific facial expression and vibration different from vibration output as the information indicating the specific facial expression.

When the user finishes using the equipment, the control unit may control the equipment to set non-permission for the user to use the equipment.

In the disclosure, when a facial expression of a user taken on a captured image is recognized and the recognized facial expression is a specific facial expression, equipment is controlled so as to allow the user to use the equipment.

According to the present disclosure, it is possible to make a user actively have a specific facial expression.

DETAILED DESCRIPTION OF EMBODIMENTS

Hereinafter, embodiments for implementing the disclosure will be described. Description thereof will be provided in the following order.
1. First Embodiment (Smiling Face Help Function)
2. Second Embodiment (Smiling Face Counting Function)
3. Third Embodiment (Smiling Face Gateway Function)

First Embodiment

A smiling face help function will be described, which is a function of helping a user to perceive whether or not the expression on a user's own face is a smile, and to have a smiling face when the expression is not a smile.
[Appearance of Information Processing Device]

Figure 1:
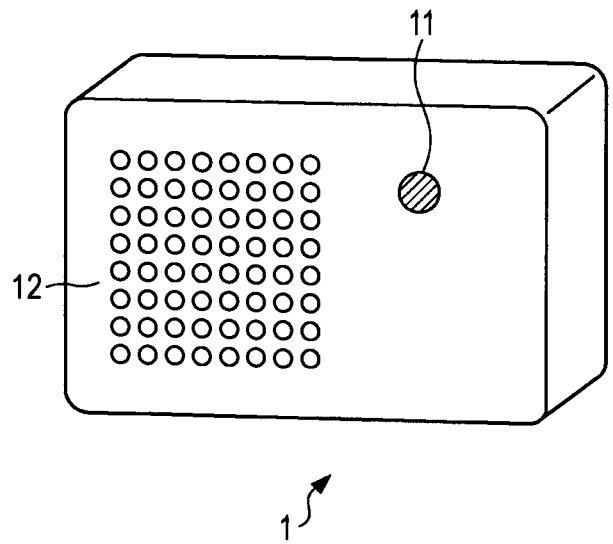
FIG. 1 is a diagram showing an example of the appearance of an information processing device according to an embodiment of the present disclosure.

FIG. 1 is a diagram showing an example of the appearance of an information processing device according to an embodiment of the present disclosure.

The information processing device of FIG. 1 has a rectangular parallelpiped housing in a size that a user can grasp the device in one hand. There are provided a lens 11 on the front surface of the housing of the information processing device 1 and an LED matrix portion 12 constituted by a predetermined number of LEDs (Light Emitting Diodes). In the example of FIG. 1, the LED matrix portion 12 is formed by providing a total of 64 LEDs including 8 LEDs arranged in the vertical direction and 8 LEDs arranged in the horizontal direction. Instead of the LED matrix portion 12, a display such as an LCD (Liquid Crystal Display), or the like may be provided.

The information processing device 1 performs capturing by conducting photoelectric conversion for light brought in from the lens 11, and, based on an image obtained from the capturing, recognizes the expression (expression on the face) of the user taken as a subject. When the information processing device 1 recognizes that the facial expression of the user is a smile, the information processing device 1 displays a smile icon that is information indicating that the facial expression of the user is a smile, by making predetermined LEDs constituting the LED matrix portion 12 emit light.

In other words, a smiling face recognition function is mounted in the information processing device 1. Determination whether or not the facial expression of a user within the capturing range of the information processing device 1 is repetitively performed based on a captured image in real time.

On the other hand, when it is recognized that the facial expression of the user is not a smile, the information processing device 1 displays a sad icon that is information indicating that the facial expression of the user is not a smile, by making predetermined LEDs constituting the LED matrix portion 12 emit light.

Figure 2:
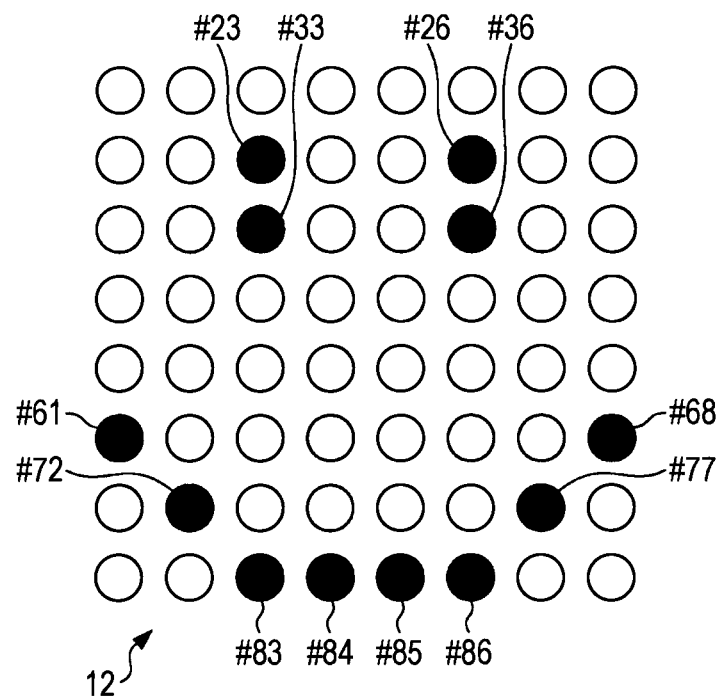
FIG. 2 is a diagram showing an example of a smile icon.
Figure 3:
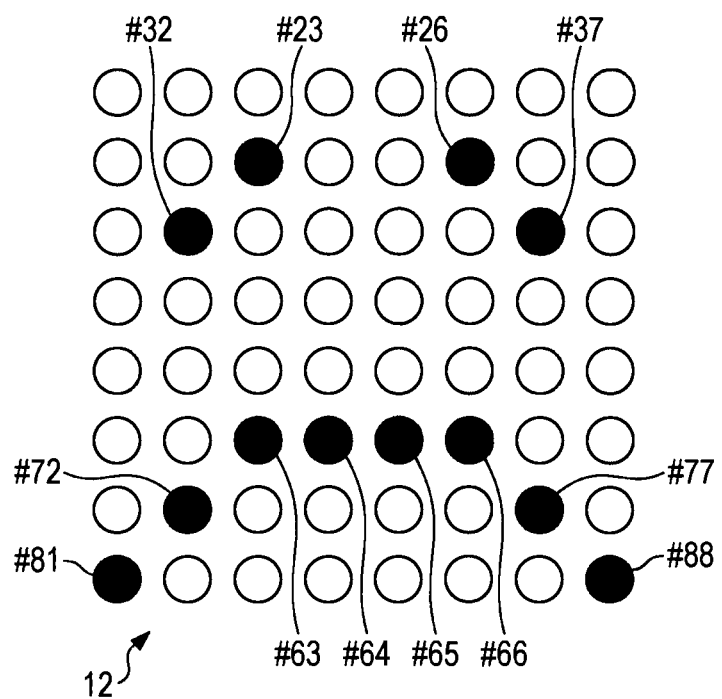
FIG. 3 is a diagram showing an example of a sad icon.

FIG. 2 is a diagram showing an example of the smile icon, and FIG. 3 is a diagram showing an example of the sad icon. Each LED constituting the LED matrix portion 12 is described by giving # and a number according to the location (row and column) such that, for example, the LED located in the first row and the first column is set to an LED #11.

As shown in FIG. 2, the smile icon is displayed by LEDs #23, #26, #33, #36, #61, #68, #72, #77, and #83 to #86 emitting light. In addition, as shown in FIG. 3, the sad icon is displayed by LEDs #23, #26, #32, #37, #63 to #66, #72, #77, #81, and #88 emitting light.

The user positioned in front of the information processing device 1 can recognize that he or she is smiling by, for example, ascertaining that the smile icon is displayed. In addition, the user can recognize that he or she has a facial expression other than a smiling face, for example, an angry expression or a sad expression after finding out that the sad icon is displayed, and then can be conscious of having a smiling face.

Based on the belief "We do not laugh because we are happy—we are happy because we laugh", the information processing device 1 can make the emotion of the user positive by making the user be aware of his or her own facial expression and consciously have a smiling face when the expression is not a smile. Since maintaining a positive emotion is deemed to be connected to the prevention and improvement of a mental disease such as depression, and the like, it is also possible to reinforce wellness of mentality of the user by making the emotion of the user positive.
[Use Example of Information Processing Device]

Figure 4:
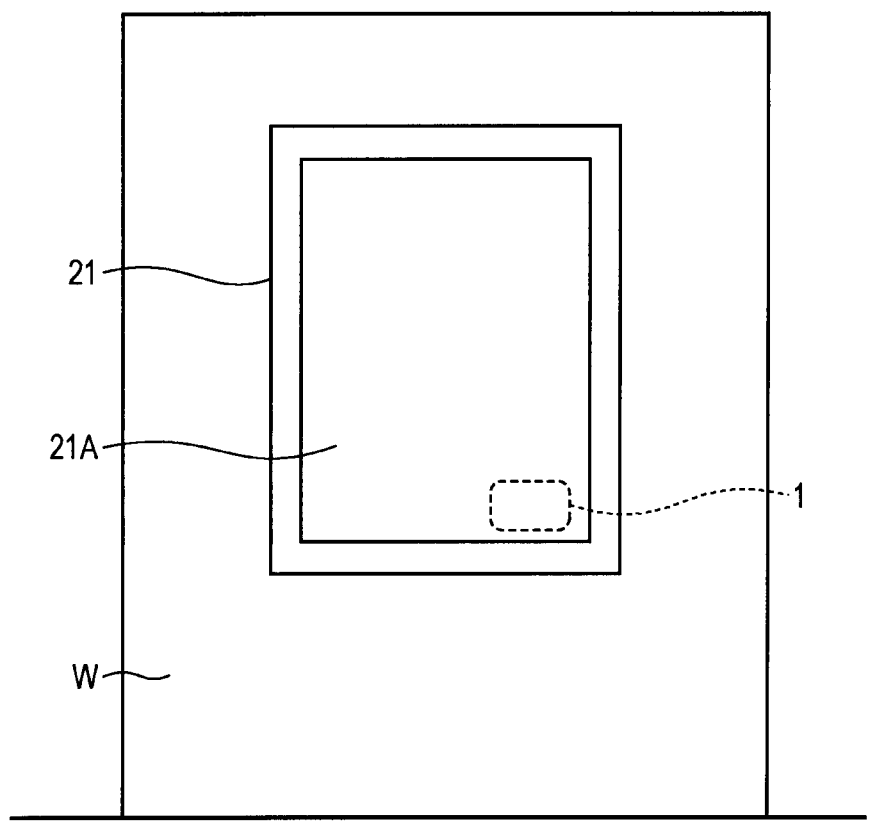
FIG. 4 is a diagram showing a use example of the information processing device according to the embodiment of the disclosure.

FIG. 4 is a diagram showing a use example of the information processing device 1.

In the example of FIG. 4, a mirror 21 is hung on a wall surface W in a building such as a house, or the like. As indicated by the dotted line, the information processing device 1 is installed in the rear side of the mirror 21 so that the front surface of the housing is toward to the forward side of the wall surface W. The front surface of the housing of the information processing device 1 may be installed to be projected from the mirror surface 21A.

The mirror surface 21A surrounded by a frame is constituted by a half-mirror. Light incident from the front side of the wall surface W to the mirror 21 is reflected on the mirror surface 21A, part of which transmits through the mirror surface 21A, and brought in by the lens 11 of the information processing device 1. In addition, light from the LED matrix portion 12 facing the surface side (the forward side of the wall surface W) of the mirror 21 from the rear side of the mirror 21 transmits through the mirror surface 21A, and the smile icon or the sad icon is displayed as if the icon emerges on the mirror surface 21A.

When the user stands in front of the mirror 21 in order to tidy himself or herself up, or the like, the information processing device 1 recognizes the facial expression of the user in front of the mirror 21, and displays the smile icon or the sad icon according to the recognized facial expression. The user sees the smile icon or the sad icon displayed as if emerging on the mirror surface 21A, and then is aware of his or her own facial expression.

Figure 5:
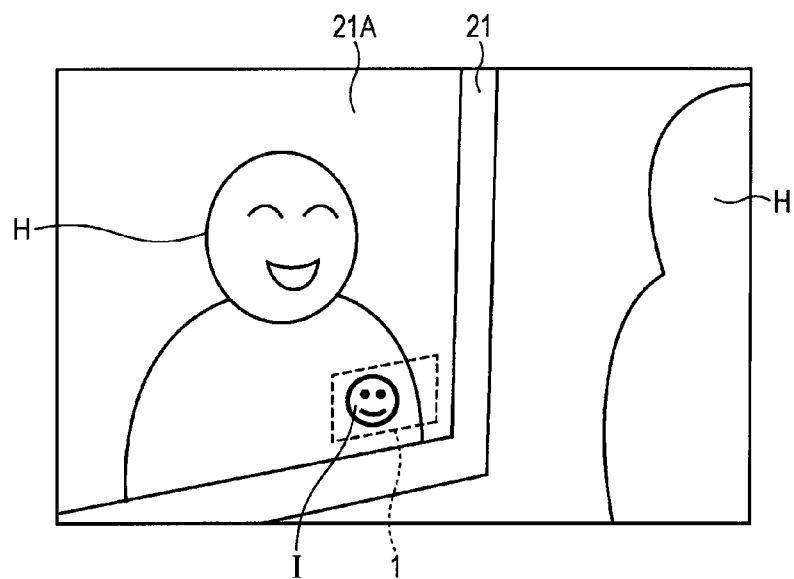
FIG. 5 is a diagram showing a display example of an icon viewed from a user standing in front of a mirror.

FIG. 5 is a diagram showing a display example of an icon viewed from the user side in front of the mirror 21. In the example of FIG. 5, the upper body of the user, who is the subject H, is reflected on the mirror surface 21A, and the facial expression of the user is a smile. A smile icon is displayed at the position of the mirror surface 21A where the information processing device 1 is installed. Icon I in FIG. 5 indicates the smile icon.

As such, by providing the information processing device 1 at a position where the face looks in daily lives, the user perceives his or her own the facial expression in ordinary times, whereby it is possible to habitually have a smiling face. An installation position of the information processing device 1 is arbitrary by being provided in the rear side of a television set or the display of a PC (Personal Computer), by being buried in a door in a building.

[Inner Configuration of Information Processing Device]

Figure 6:
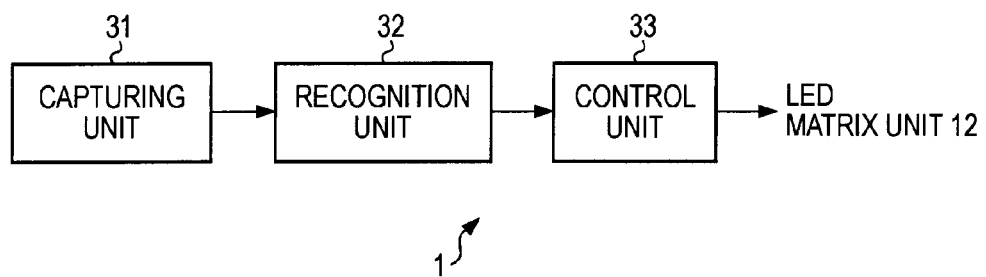
FIG. 6 is a block diagram showing an inner configuration example of the information processing device according to the embodiment of the disclosure.

FIG. 6 is a block diagram showing an internal configuration example of the information processing device 1. At least some of the configuration shown in FIG. 6 is realized to execute a predetermined program by a CPU (Central Processing Unit) provided in the information processing device 1.

The information processing device 1 includes a capturing unit 31, a recognition unit 32, and a control unit 33.

The capturing unit 31 is constituted by imaging elements such as a CCD (Charge Coupled Device), a CMOS (Complementary Metal Oxide Semiconductor), or the like. The capturing unit 31 performs photoelectric conversion for light brought by the lens 11, and carries out various processes such as A/D conversion, and the like, for a signal obtained from the photoelectric conversion. The capturing unit 31 outputs image data obtained after implementing the various processes to the recognition unit 32. The capturing unit 31 repeats capturing, and supplies image data obtained after the repetitive capturing to the recognition unit 32 one after another.

The recognition unit 32 analyses images captured by the capturing unit 31, and recognizes the facial expression of the user taken in the images as a subject. The recognition unit 32 outputs information indicating the recognition result to the control unit 33. In addition, the recognition unit 32 outputs information appropriately indicating the degree of a smile such as a big laugh, a faint smile, or the like.

The recognition unit 32 is given, in advance, with information which has been obtained from the analysis of the images of the smiling face and indicates feature values of each part constituting the smiling face such as eyes, nose, and mouth, as data for recognition. The recognition unit 32 detects the face of the user by performing contour detection, or the like from the images captured by the capturing unit 31, and extracts feature values of each part of the face including eyes, nose, and mouth.

In addition, the recognition unit 32 compares the feature values extracted from the captured images to the feature values given as the data for recognition, and recognizes the facial expression of the user as a smiling face when the index of coincidence of both values is equal to or higher than a threshold value. On the other hand, when the index of coincidence between the feature values extracted from the captured images and the feature values given as the data for recognition is less than the threshold value, the recognition unit 32 recognizes that the facial expression is not a smiling face. In other words, the smiling face recognized by the information processing device 1 is the facial expression with characteristics of each part of the face extracted from the captured images which coincide with, to the threshold value or greater, the characteristics of the face extracted from the face image selected as an image of a smiling face when the function of recognizing a smiling face was developed, or the like.

The control unit 33 causes the LED matrix portion 12 to display the smile icon when the facial expression of the user is determined to be a smile, based on the information supplied from the recognition unit 32. It may be possible that a different type of smile icon is displayed depending on the degree of the smiling face indicated by the information supplied from the recognition unit 32. In addition, the control unit 33 causes the LED matrix portion 12 to display the sad icon when the facial expression of the user is determined not to be a smile.

The control unit 33 causes a speaker not shown in the drawing to output a predetermined melody appropriately in accordance with the display of the icon. A melody output in accordance with the display of the smile icon and a melody output in accordance with the display of the sad icon are set to different ones respectively. It may be possible to use favorite music that the user has registered in advance as the melody output in accordance with the display of the smile icon. Accordingly, the user can recognize his or her own facial expression through the music, and boost the mood listening to the favorite music when the user has a smiling face.

As such, as a feedback denoting a face recognition result, it is possible to adopt various ways such as an output of a melody, generation of vibration, or the like. In addition, it is also possible for the information processing device 1 not to include the capturing unit 31. In this case, for example, images captured by an external device are acquired by the recognition unit 32 of the information processing device 1 as images to recognize the facial expression of the user. The recognition unit 32 recognizes the facial expression of the user based on the acquired images, and the control unit 33 performs a process to give a feedback according to the facial expression to the user.

[Operation of Information Processing Device]

Figure 7:
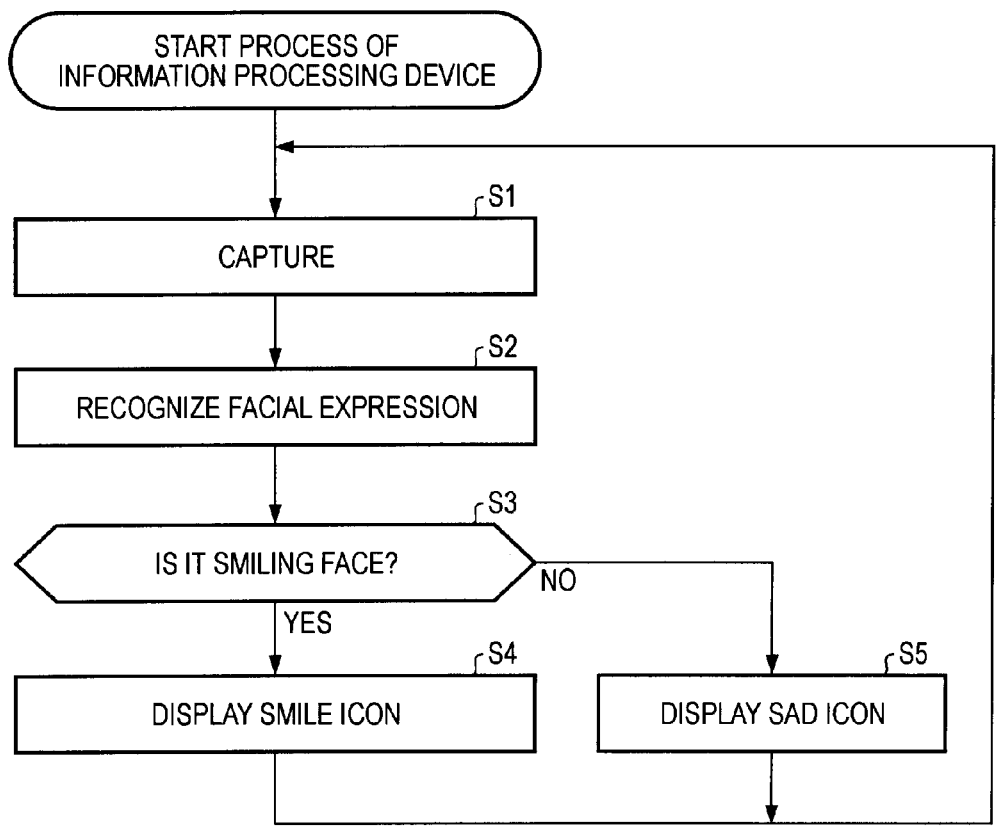
FIG. 7 is a flowchart describing a process of the information processing device according to the embodiment of the disclosure.

Herein, with reference to the flowchart of FIG. 7, a process of the information processing device 1 will be described, which makes the user be aware of his or her own facial expression using the display of an icon and helps the user to have a smiling face.

In Step S1, the capturing unit 31 performs capturing.

In Step S2, the recognition unit 32 analyses images captured by the capturing unit 31, and recognizes the facial expression of the user taken in the images.

In Step S3, the control unit 33 determines whether or not the facial expression of the user is a smile based on information supplied from the recognition unit 32.

When the facial expression of the user is determined to be a smile in Step S3, in Step S4, the control unit 33 causes the LED matrix portion 12 to display the smile icon.

On the other hand, when the facial expression of the user is determined not to be a smile in Step S3, in Step S5, the control unit 33 causes the LED matrix unit 12 to display the sad icon.

After the smile icon is displayed in Step S4, or after the sad icon is displayed in Step S5, the process returns to Step S1, and the above process is repeated. When the user, who has recognized that he or she did not have a smiling face from the display of the sad icon, intentionally makes a smiling face, the display of the LED matrix unit 12 is switched from the sad icon to the smile icon.

With the above process, the information processing device 1 can make the user be aware of his or her own facial expression, and can make the user have a good mood by causing his or her smiling face.

Second Embodiment

Description will be provided on a smiling face counting function that is a function of counting and presenting the number of smiling faces.

[Configuration of Communication System]

Figure 8:
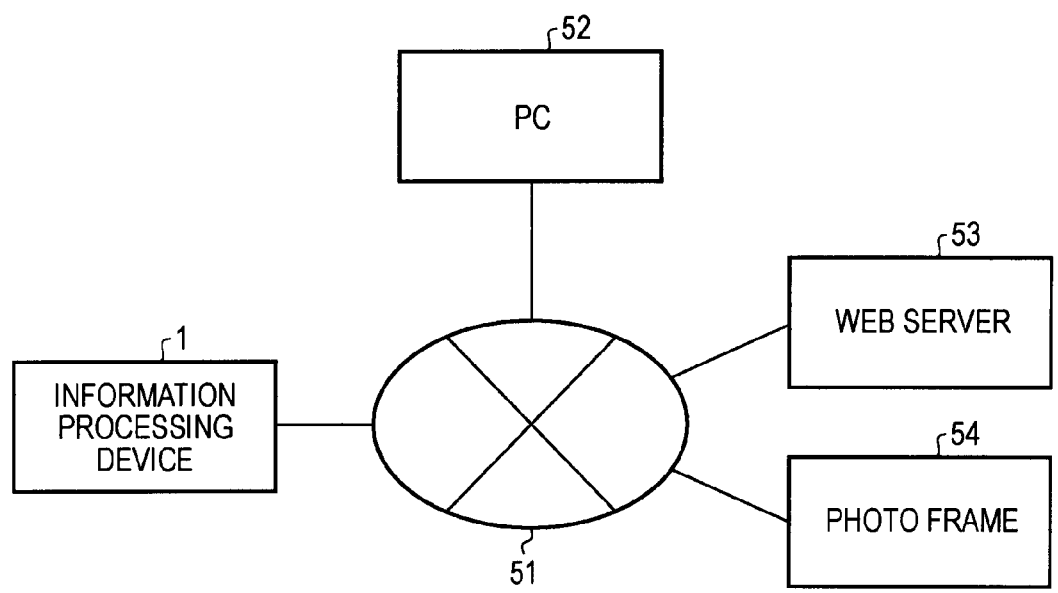
FIG. 8 is a diagram showing a configuration example of a communication system.

FIG. 8 is a diagram showing a configuration example of a communication system using the information processing device 1.

The information processing device 1 of FIG. 8 has a communication function. The information processing device 1 is connected to a network 51 including the Internet, or the like. The network 51 is also connected to a PC 52, a web server 53, and a photo frame 54.

The PC 52 is, for example, a PC that the user of the information processing device 1 uses. The web server 53 is a server to manage SNS (Social Network Service) sites such as blogs, message boards, or the like. The photo frame 54 is a digital photo frame installed in, for example, a person's home other than the user of the information processing device 1. The photo frame 54 is provided with a display, and is possible to receive and display images transmitted through the network 51.

In the communication system of FIG. 8, functions are realized, which are contributing messages indicating the number of smiling faces to SNS sites, displaying the list of the number of smiling faces for every predetermined period, and transmitting images of smiling faces to the photo frame 54. Details of the functions will be described later.

Figure 9:
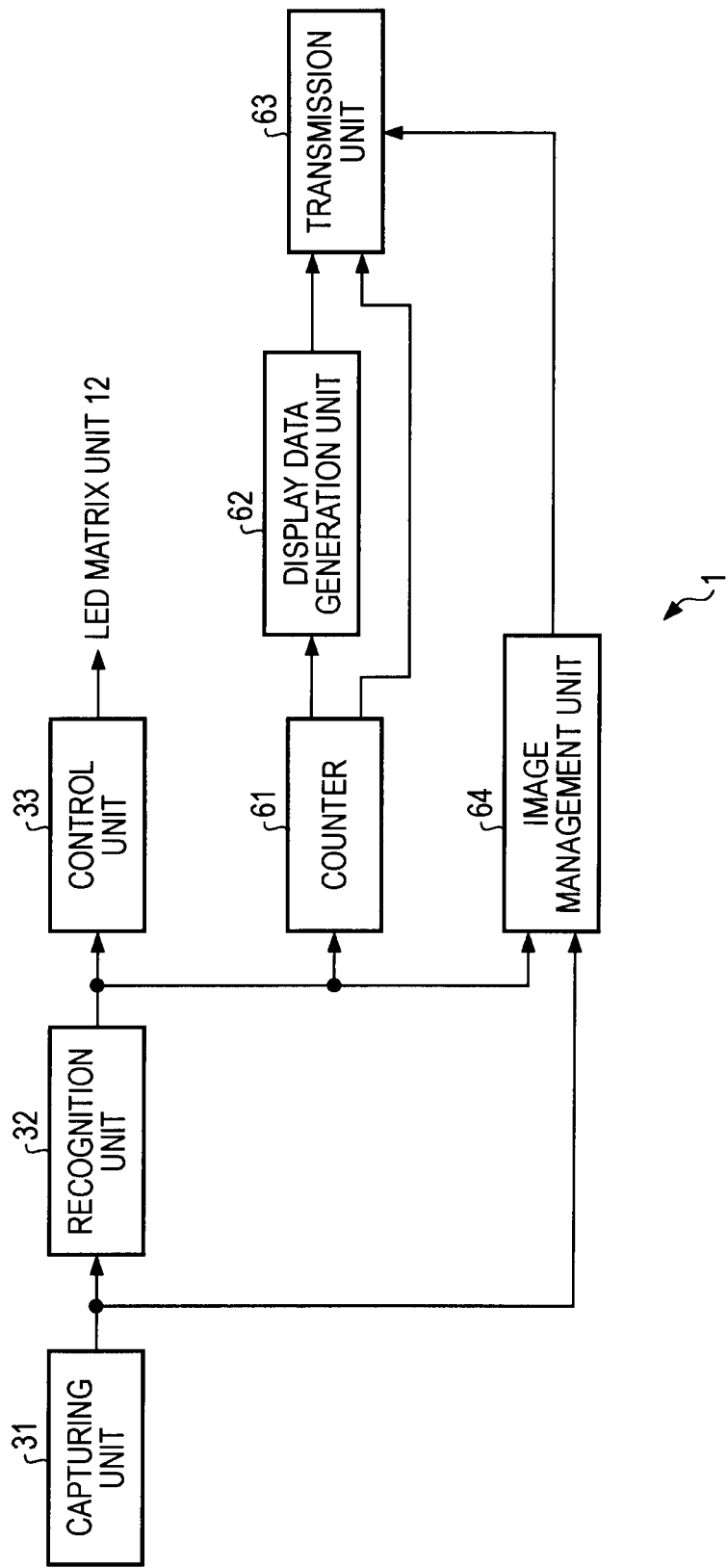
FIG. 9 is a diagram showing a configuration example of the information processing device of FIG. 8 according to another embodiment of the disclosure.

FIG. 9 is a block diagram showing a configuration example of the information processing device 1 of FIG. 8. In the configuration shown in FIG. 9, the same reference numerals are given to the same configurations as those shown in FIG. 6. Overlapping description will be appropriately omitted.

The information processing device 1 includes the capturing unit 31, the recognition unit 32, the control unit 33, a counter 61, a display data generation unit 62, a transmission unit 63, and an image management unit 64.

The capturing unit 31 outputs image data obtained from capturing. The image data output from the capturing unit 31 is supplied to the recognition unit 32 and the image management unit 64.

The recognition unit 32 analyses images captured by the capturing unit 31, and recognizes facial expressions of the user. The recognition unit 32 outputs information indicating the recognition result and information indicating the degree of a smiling face to the control unit 33, the counter 61, and the image management unit 64.

When it is determined that the facial expression of the user is a smile based on the information supplied from the recognition unit 32, the counter 61 increases the number of smiling faces by one, and manage information indicating the number of smiling faces by storing in a memory. When a message indicating the number of smiling faces is contributed to an SNS site, the counter 61 outputs the information indicating the number of smiling faces to the display data generation unit 62 at a time point when the number of smiling faces for a predetermined period of time such as one day reaches a threshold value or higher.

In addition, when the list of the number of smiling faces is displayed and a predetermined period such as one day, one week, one month, or the like have passed, the counter 61 outputs the information indicating the number of smiling faces to the transmission unit 63. Hereinafter, a case where a period for which the number of smiling faces is counted is one day will be described.

The display data generation unit 62 generates a message indicating the number of smiling faces counted by the counter 61 and outputs the data of the generated message to the transmission unit 63.

When the message indicating the number of smiling faces is contributed to an SNS site, the transmission unit 63 has access to the web server 53 through the network 51, and transmits the message generated by the display data generation unit 62.

In addition, when the list of the number of smiling faces is displayed, the transmission unit 63 transmits the information indicating the number of smiling faces supplied from the counter 61 and an image selected by the image management unit 64 to the web server 53.

When the list of the number of smiling faces is displayed, the image management unit 64 specifies an image in which a smiling face of the user is taken from images captured by the capturing unit 31 based on the recognition result by the recognition unit 32, and manages the specified smiling face image by storing in the memory. As described above, the recognition unit 32 also supplies information indicating the degree of a smiling face, such as a big laugh, a faint smile, or the like. The image management unit 64 manages the degrees of smiling faces taken in each image corresponding to the images of the smiling faces.

The image management unit 64 selects an image with the highest degree of a smiling face from images stored in the memory and outputs the image to the transmission unit 63 so as to transmit the image to the web server 53.

Figure 10:
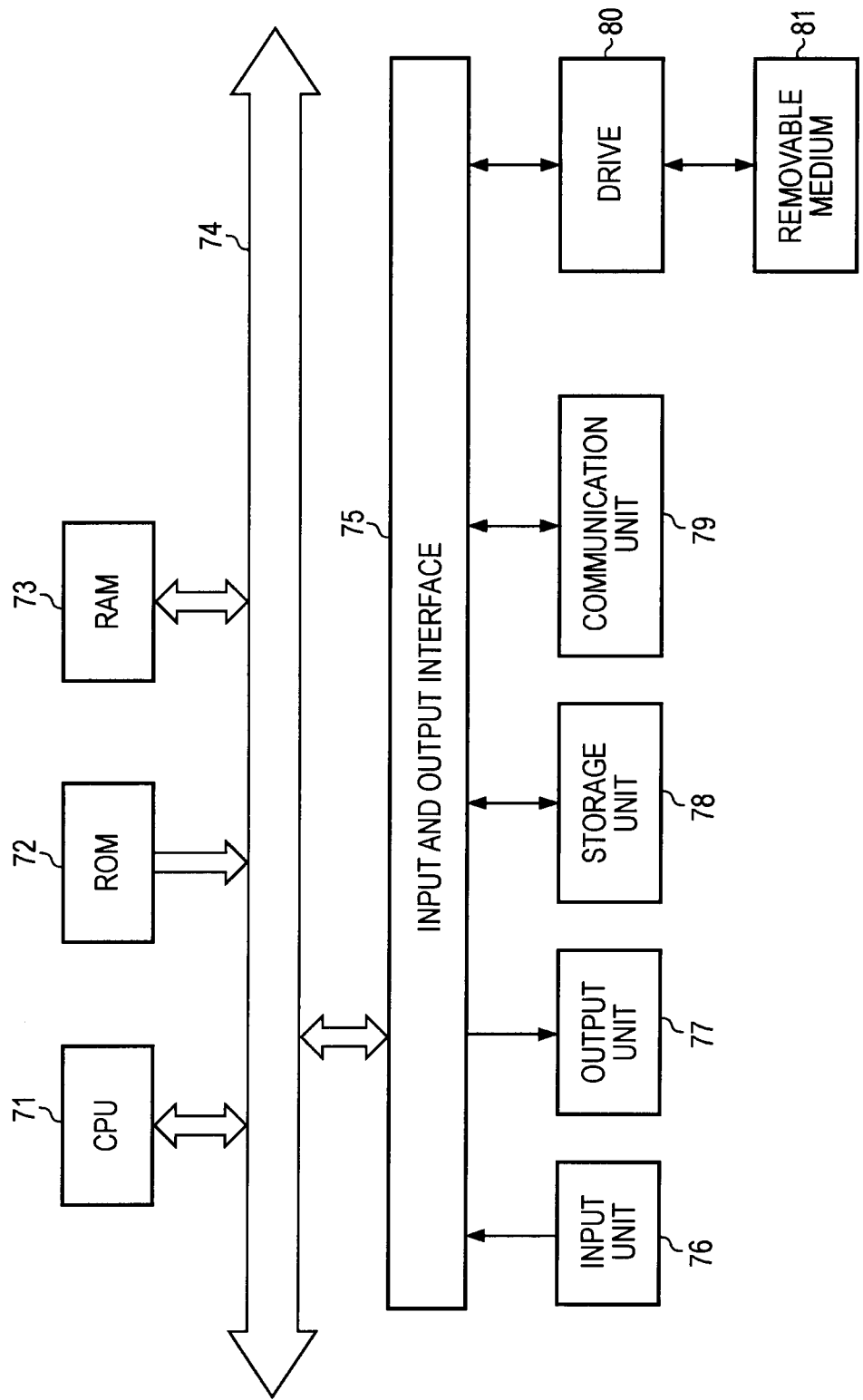
FIG. 10 is a block diagram showing a hardware configuration example of a web server.

FIG. 10 is a block diagram showing a hardware configuration example of the web server 53.

A CPU (Central Processing Unit) 71, a ROM (Read Only Memory) 72, and a RAM (Random Access Memory) 73 are connected to one another via a bus 74.

Furthermore, an input and output interface 75 is connected to the bus 74. The input and output interface 75 is connected to an input unit 76 including a keyboard, a mouse, and the like, and an output unit 77 including a display, a speaker, and the like. In addition, the input and output interface 75 is connected to a storage unit 78 including a hard disk, a non-volatile memory, and the like, a communication unit 79 including a network interface, and the like, and a drive 80 for driving a removable medium 81.

Figure 11:
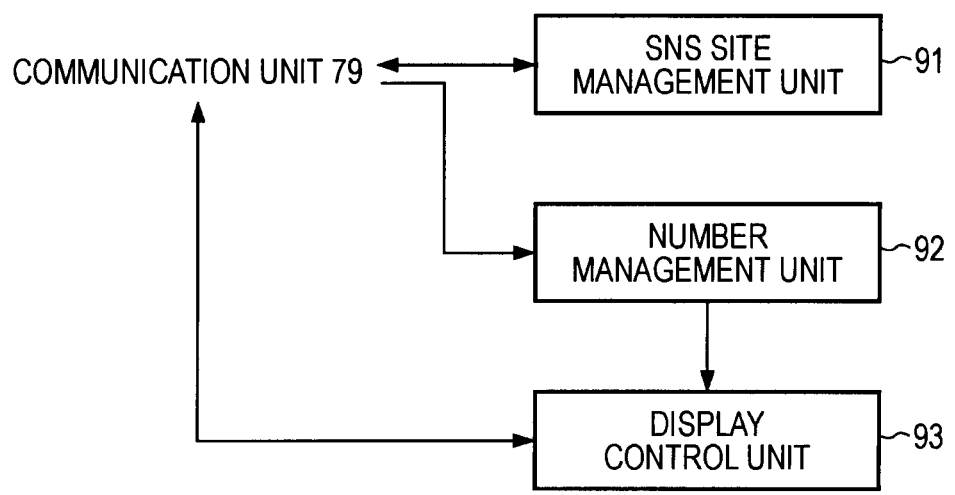
FIG. 11 is a block diagram showing a functional configuration example of the web server.

FIG. 11 is a block diagram showing a functional configuration example of the web server 53. At least some of the function units shown in FIG. 11 are realized by executing predetermined programs by the CPU 71 of FIG. 10.

In the web server 53, an SNS site management unit 91, a number management unit 92, and a display control unit 93 are realized.

The SNS site management unit 91 manages SNS sites, and allows devices that have had access through the network 51 to review the sites. The SNS site management unit 91 acquires messages transmitted from the devices connected to the network 51 controlling the communication unit 79, and adds the messages to the SNS sites.

When the information indicating the number of smiling faces counted for one day in the information processing device 1 and the image selected in the information processing device 1 as an image with the highest degree of a smiling face are transmitted from the information processing device 1, the number management unit 92 acquires the information controlling the communication unit 79.

The number management unit 92 causes the storage unit 78 to store the acquired information, for example, corresponding to identification information of the information processing device 1.

When the devices connected to the network 51 request for displaying the list of the number of smiling faces, the display control unit 93 acquires the information managed by the number management unit 92, and causes the list of the number of smiling faces counted for each day to be displayed using, for example, the image of a calendar. In addition, when one day is selected on the image of the calendar, the display control unit 93 causes an image, which is captured on the day and transmitted from the information processing device 1 as the image with the highest degree of a smiling face, to be transmitted to the devices that requested display of the list of the number of smiling faces to be displayed.

[Contribution to SNS Site]

Herein, with reference of the flowchart of FIG. 12, a process of the information processing device 1 contributing the message indicating the number of smiling faces to an SNS site will be described.

In Step S11, the capturing unit 31 performs capturing.

In Step S12, the recognition unit 32 analyzes the image captured by the capturing unit 31, and recognizes the facial expression of the user.

In Step S13, the control unit 33 determines whether or not the facial expression of the user is a smile based on the information supplied from the recognition unit 32.

When the facial expression of the user is determined to be a smile in Step S13, in Step S14, the control unit 33 gives feedback by displaying a smile icon to the LED matrix unit 12, or the like.

On the other hand, when the facial expression of the user is determined not to be a smile in Step S13, the process returns to Step S11, and the above process is repeated. When the facial expression of the user is determined not to be a smile, the control unit 33 may give feedback to the user by displaying a sad icon to the LED matrix unit 12, or the like.

After the smile icon is displayed in Step S14, in Step S15, the counter 61 counts the number of smiling faces.

In Step S16, the counter 61 determined whether or not the number of smiling faces for a predetermined period is equal to or higher than a predetermined number that is a threshold value.

When the number of smiling faces is determined to be equal to or higher than the threshold value in Step S16, in Step S17, the display data generation unit 62 generates a message indicating the number of smiling faces counted by the counter 61.

In Step S18, the transmission unit 63 transmits the message generated by the display data generation unit 62 to the web server 53 to contribute the message to the SNS site. After the message is contributed thereto, or when the number of smiling faces is determined not to be equal to or higher than the threshold value in Step S16, the process returns to Step S11, and the above process is repeated.

The information transmitted from the transmission unit 63 is acquired by the SNS site management unit 91 of the web server 53, and posted on the SNS site.

Figure 13:
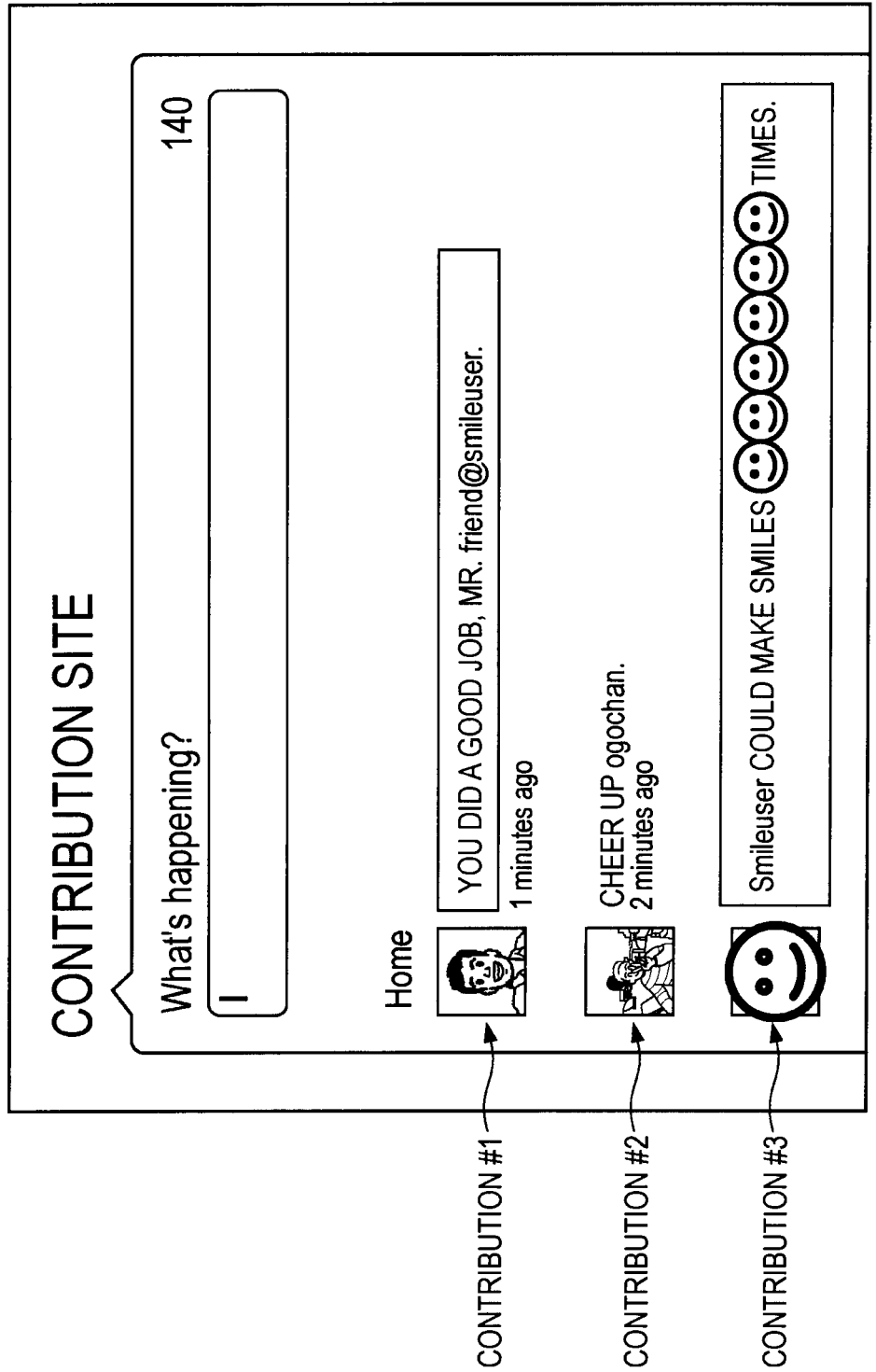
FIG. 13 is a diagram showing an example of a screen of an SNS site.

FIG. 13 is a diagram showing an example of the screen of the SNS site. The screen of FIG. 13 is displayed when the PC 52 or other devices such as a mobile telephone, or the like has access to the web server 53 using a browsing function.

On the screen of the SNS site of FIG. 13, messages contributed from each device are displayed in time series order, and Contribution #1 that is the latest contribution, Contribution #2 that has been contributed before Contribution #1, and Contribution #3 that has been contributed before Contribution #2 are displayed. Contribution #3 is the message contributed from the information processing device 1, and shows that the number of smiling faces counted for one day is six. In the example of FIG. 13, the number of smiling faces is expressed by the number of images indicating smiling faces. "Could make smiles OOOOOO times today" indicated as Contribution #3 (O is an image showing a smiling face) is the message generated by the display data generation unit 62.

Friends, and the like of the user of the information processing device 1 who read Contribution #3 contribute messages praising or supporting the number of smiling faces through their own devices, and the user of the information processing device 1 who checks the contributions of his or her friends, and the like can awake himself or herself to make smiling faces more actively. Contributions #1 and #2 of FIG. 13 are messages contributed by the friends, and the like of the user of the information processing device 1, praising or supporting the number of smiling faces. In addition, the user of the information processing device 1 can share the number of smiling faces with the friends, and the like.

[Display of List of the Number of Smiling Faces]

Next, with reference to the flowchart of FIG. 14, a process of the information processing device 1 for displaying the list of the number of smiling faces for each predetermined period will be described.

Figure 12:
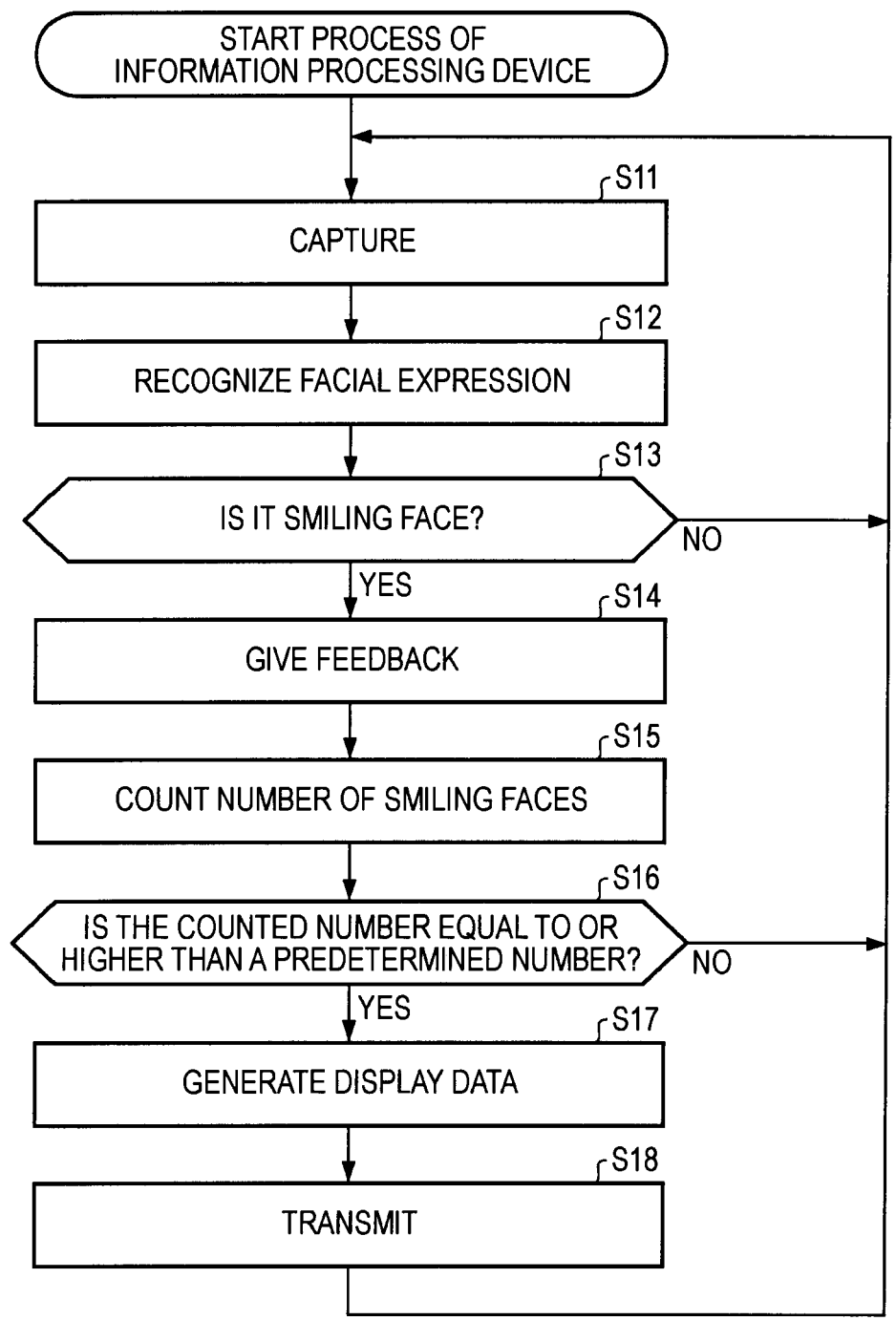
FIG. 12 is a flowchart describing a process of the information processing device according to the embodiment of the disclosure.
Figure 14:
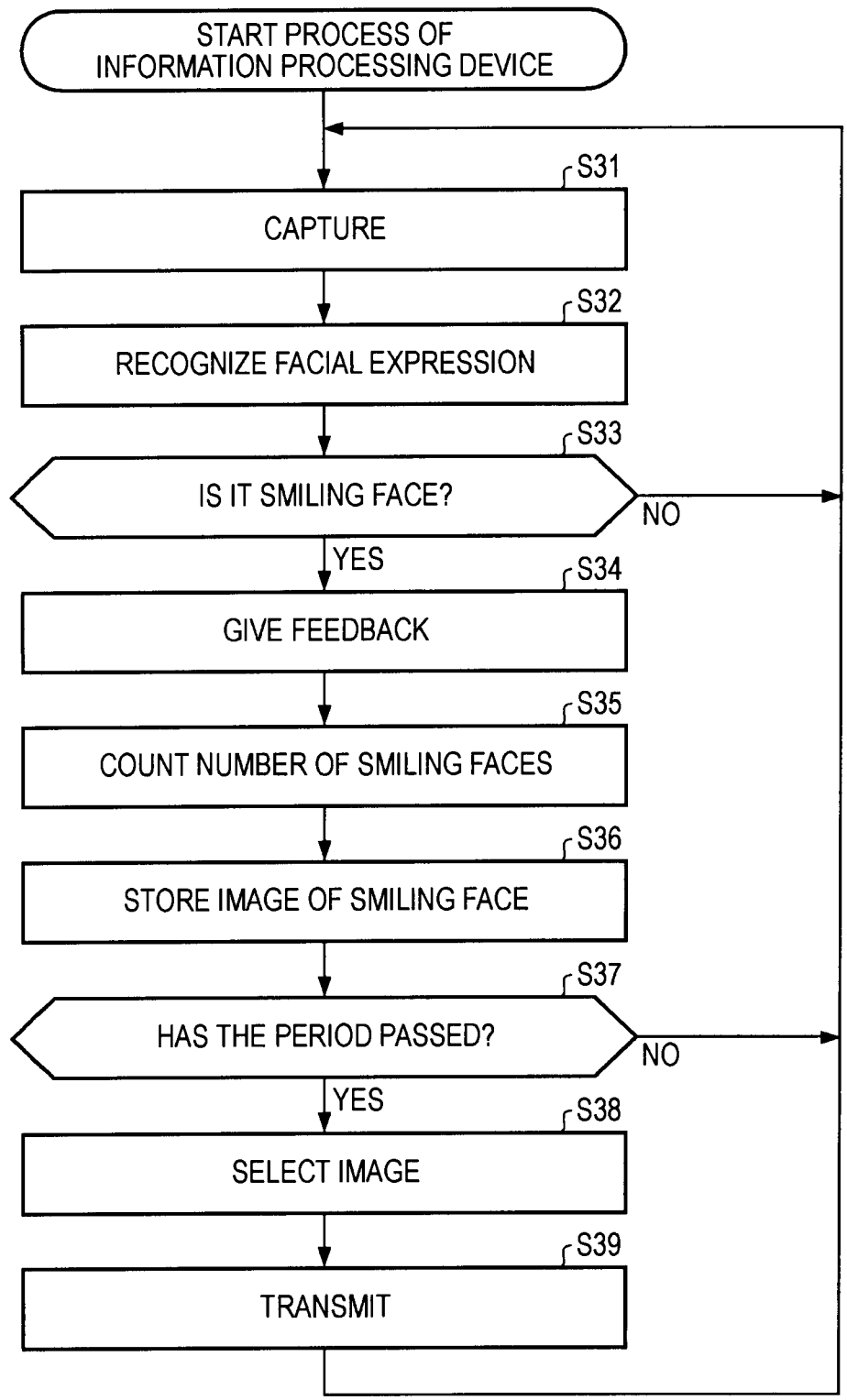
FIG. 14 is a flowchart describing a process of the information processing device according to the embodiment of the disclosure.

Processes of Steps S31 to S35 of FIG. 14 are basically the same processes as those of Steps S11 to S15 of FIG. 12. In Step S31, the capturing unit 31 performs capturing. Images captured are supplied to the recognition unit 32 and to the image management unit 64.

In Step S32, the recognition unit 32 analyses the images captured by the capturing unit 31 and recognizes the facial expression of the user.

In Step S33, the control unit 33 determines whether or not the facial expression of the user is a smile based on the information supplied from the recognition unit 32.

When the facial expression of the user is determined to be a smile in Step S33, in Step S34, the control unit 33 gives feedback causing the LED matrix unit 12 to display a smile icon, or the like. On the other hand, when the facial expression of the user is determined not to be a smile in Step S33, processes after Step S31 are repeated.

In Step S35, the counter 61 counts the number of smiling faces.

In Step S36, the image management unit 64 causes a memory to store an image that is recognized that a smiling face is taken therein and information indicating the degree of a smiling face recognized by the recognition unit 32 for management.

In Step S37, the counter 61 determines whether or not one day that is a period for which the number of smiling faces has to be counted has passed.

When the period for which the number of smiling faces has to be counted is determined to have passed in Step S37, in Step S38, the image management unit 64 selects an image with the highest degree of smiling face.

In Step S39, the transmission unit 63 transmits information indicating the number of smiling faces counted by the counter 61 and the image of a smiling face selected by the image management unit 64 to the web server 53.

After the information indicating the number of smiling faces and the image of the smiling face are transmitted, or when the period for which the number of smiling faces has to be counted is determined to have not passed in Step S37, the process returns to Step S31, and the above processes are repeated.

The information transmitted from the transmission unit 63 is acquired by the number management unit 92 of the web server 53, and managed. When the user of the information processing device 1 makes access to the web server 53 operating, for example, the PC 52, and requests for displaying the list of the number of smiling faces, an image of a calendar for displaying the list of the number of smiling faces is displayed on a display of the PC 52 based on information transmitted from the display control unit 93.

Figures 15, 16:
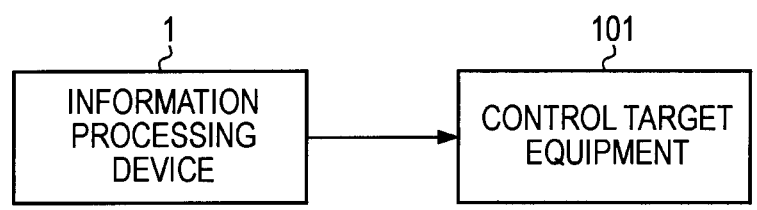
FIG. 15 is a diagram showing an example of a screen of a calendar.
FIG. 16 is a diagram showing a control target device.

FIG. 15 is a diagram showing an example of a screen of the calendar displayed on the display of the PC 52 based on the information transmitted from the web server 53.

Calendar image P of FIG. 15 is an image of a calendar for a certain month, and icons indicating the number of smiling faces counted for each day are displayed in the cells for the first to fifteenth days out of cells corresponding to first to thirty-first days. Calendar image P is an image displayed when the fifteenth day has passed.

In the example of FIG. 15, icons with different degrees of smiling faces are displayed in accordance with the range of the number of smiling faces. For example, the icon with a dark facial expression displayed in the cell for the seventh day indicates that the number of smiling faces counted on that day is, for example, zero to five, and the icon with a smiling face displayed in the cell for the fifth day indicates that the number of smiling faces counted on that day is, for example, six to ten. The icon with the big laugh displayed in the cell for the first day indicates that the number of smiling faces counted on that day is, for example, eleven.

When an icon indicating the number of smiling faces displayed on calendar image P is selected through a mouse operation, or the like, the display control unit 93 of the web server 53 transmits to the PC 52 an image selected by the information processing device 1 among images (photos) captured on the day for which the selected icon is displayed as an image with the highest degree of a smiling face, and have the image to be displayed on the display.

The user of the information processing device 1 can recognize the number of smiling faces for each day from the types of the icons displayed on calendar image P, and can awake himself or herself to make a smiling face more actively when the number is low. In addition, friends, and the like of the user of the information processing device 1 make access to the web server 53 through an operation of their own devices to see calendar image P, and can check whether the user of the information processing device 1 makes smiling faces, in other words, the user is in a bright mood.

Furthermore, as above, the functions of managing the number of smiling faces and displaying the list thereof may be installed in the PC 52. In this case, the PC 52 is provided with the number management unit 92 and the display control unit 93 of FIG. 11, and performs a process of displaying the list of the number of smiling faces based on information transmitted from the information processing device 1. The information processing device 1 may be provided with the number management unit 92 and the display control unit 93 so as to recognize the number of smiling faces through display of the LED matrix unit 12 and an LCD provided in the information processing device 1.

[Transmission to Photo Frame]

A function of transmitting images to the photo frame 54 will be described. In this case, the information processing device 1 of FIG. 8 recognizes a facial expression of the user taken in a captured image, and gives feedback to the user by displaying icons, or the like. In addition, when a smiling face is recognized, the information processing device 1 transmits an image in which the recognized smiling face is taken to the photo frame 54.

The photo frame 54 that receives the image transmitted from the information processing device 1 causes the display to display the received image. Accordingly, for example, when the photo frame 54 is installed in somebody's home other than the user of the information processing device 1, the user of the photo frame 54 can see the image of a smiling face of the user of the information processing device 1. This function is considered to be particularly useful when the user of the information processing device 1 is an old person living alone and the user of the photo frame 54 is his or her offspring. The offspring who is the user of the photo frame 54 can recognize a smiling face of his or her parent who is the user of the information processing device 1.

Third Embodiment

A smiling face gateway function that is a function of requesting a smiling face when the user takes an action will be described.

As shown in FIG. 16, the information processing device 1 is electrically connected to control target equipment 101 that is equipment to be controlled in a wired or wireless manner. A case where the control target equipment 101 is a refrigerator will be described.

Figure 17:
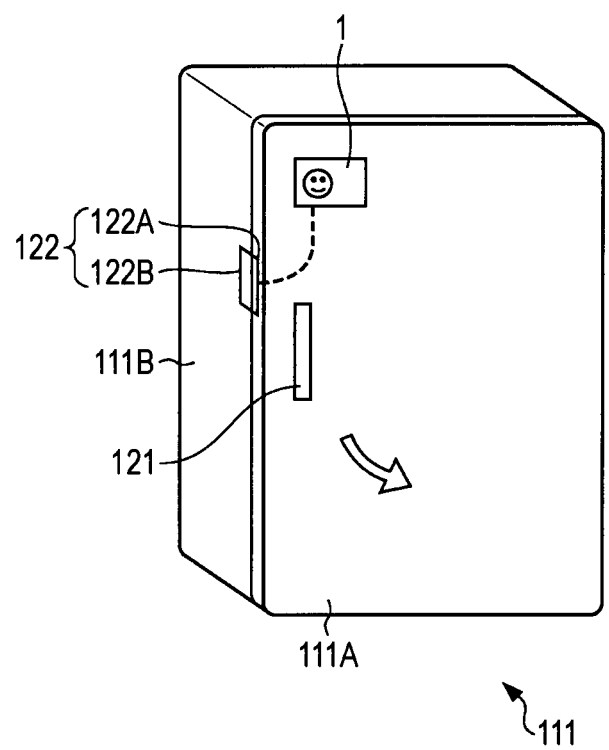
FIG. 17 is a diagram showing the appearance of a refrigerator as a control target device.

FIG. 17 is a diagram showing the appearance of a refrigerator to which the information processing device 1 is fixed.

The refrigerator 111 of FIG. 17 is constituted by a door 111A and the main body 111B. The door 111A is fixed to the main body 111B so as to be open and closed via a hinge (not shown in the drawing) provided on the right side face of the door 111A. A grip 121 is provided in the left side of the surface of the door 111A. An action of opening the door 111A is grasping the grip 121 with, for example, the right hand and pulling the grip to the front as shown by the white arrow.

The information processing device 1 is installed at the position that is on the surface of the door 111A and above the grip 121 so that the front face of the housing thereof faces the front direction of the refrigerator 111. On the left side face of the door 111A, a member 122A including an electric lock 122 is provided, and on the left side face of the main body 111B, a member 122B constituting the electric lock 122 making a pair with the member 122A. The members 122A and 122B are provided at the position where the members adjoin each other when the door 111A is closed.

The electric lock 122 is connected to the information processing device 1 as shown by the dotted line, and switches the door 111A to a locked state or an unlocked state according to a control signal supplied from the information processing device 1. When the electric lock 122 is in the locked state, the user is not able to open the door 111A, but able to open the door 111A when the lock is in the unlocked state.

The information processing device 1 installed in the refrigerator 111 in such a state gives feedback to the user in accordance with the facial expressions by capturing images, recognizing the facial expressions of the user, and displaying icons, in the same manner as the information processing device 1 of FIG. 1.

In addition, when a facial expression of the user is recognized to be a smile, the information processing device 1 outputs a control signal instructing the electric lock 122 to be in the unlocked state so as to open the door 111A, whereby the user is allowed to use the refrigerator 111. In addition, when the user closes the door 111A finishing the use of the refrigerator 111 in the unlocked state of the electric lock 122, the information processing device 1 outputs a control signal instructing the electric lock 122 to be in the locked state so as to prohibit from opening the door 111A.

In other words, it is necessary for the user to make a smiling face in order to open the door 111A of the refrigerator 111, that is, to use the refrigerator 111. As such, the information processing device 1 can make the user be aware of making smiling faces at ordinary times by requesting making smiling faces in ordinary actions such as using the refrigerator 111, in other words, by compelling smiling faces.

Figure 18:
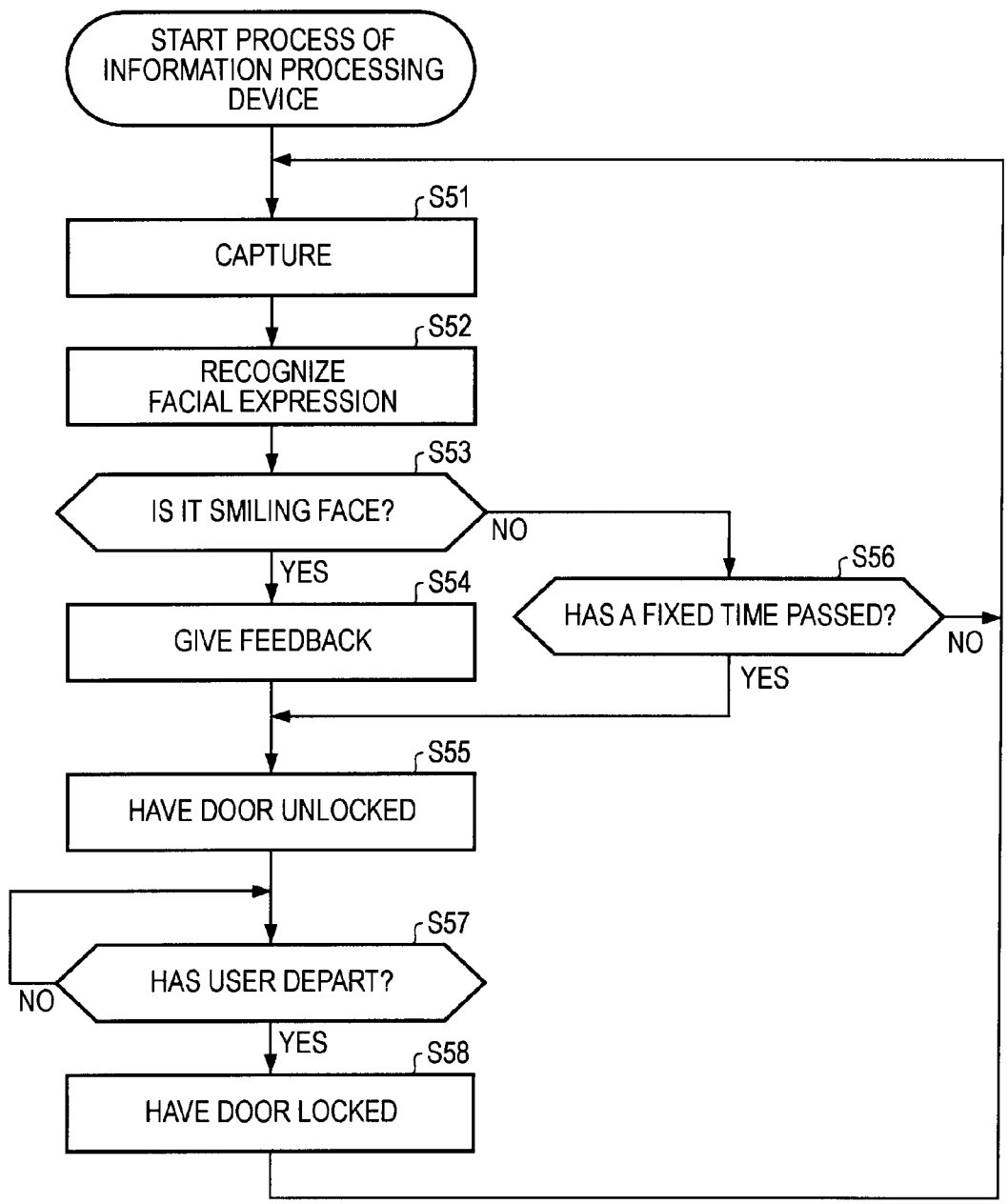
FIG. 18 is a flowchart describing a process of the information processing device according to the embodiment of the disclosure.

Herein, with reference of the flowchart of FIG. 18, a process of the information processing device 1 for controlling permission and non-permission to use the refrigerator 111 will be described. Furthermore, the information processing device 1 of FIG. 17 has the same configuration as that in FIG. 6 or FIG. 10.

In Step S51, the capturing unit 31 performs capturing.

In Step S52, the recognition unit 32 analyzes images captured by the capturing unit 31, and recognizes a facial expression of the user.

In Step S53, the control unit 33 determines whether or not the facial expression of the user is a smile based on information supplied from the recognition unit 32.

When the facial expression of the user is determined to be a smile in Step S53, in Step S54, the control unit 33 gives feedback by causing the LED matrix unit 12 to display a smile icon.

In Step S55, the control unit 33 outputs a control signal to the electric lock 122 to put the door 111A in an unlocked state. Accordingly, the user can open the door 111A and takes out food from the refrigerator 111, or the like.

On the other hand, when the facial expression of the user is determined not to be a smile in Step S53, in Step S56, the control unit 33 determines whether or not a fixed time has passed after, for example, it is detected that the user is in front of the refrigerator 111. Whether or not the user is in front of the refrigerator 111 is recognized by the recognition unit 32 based on, for example, a captured image.

When it is determined that a fixed time has passed in Step S56, the control unit 33 outputs a control signal to the electric lock 122 to put the door 111A in the unlocked state in Step S55 in the same manner. In this example, the door 111A is designed to be opened without making a smiling face when a fixed time has passed after the user is detected to be in front of the refrigerator 111, but the user may not be allowed to open the door unless the user makes a smiling face.

After the door 111A is put in the unlocked state in Step S55, in Step S57, the control unit 33 determines whether or not the user has closed the door 111A and departed from the refrigerator 111, and stands by until the user is determined to have departed from the refrigerator 111. For example, when the door 111A is detected to be closed, it is determined that the user has departed from the refrigerator 111.

When the user is determined to have departed from the refrigerator 111 in Step S57, in Step S58, the control unit 33 outputs a control signal to the electric lock 122 to put the door 111A in a locked state. After the door 111A is in the locked state, or when it is determined that a fixed time has passed in Step S56, the process returns to Step S51, and the above processes are repeated. When the facial expression of the user is determined not to be a smile in Step S53, feedback may be given to the user by causing the LED matrix unit 12 to display a sad icon, or the like.

With the process above, the information processing device 1 can so-called "compel" the user to make a smiling face, and can make the user be aware of making a smiling face.

In the above description, equipment to be controlled is set to the refrigerator 111, but it is possible to control access (permit or non-permit) to various items that the user uses in his or her daily life.

It is possible to make the user be aware of having a smiling face giving a carefree feeling that the user is not able to enter a room without having a smiling face, for example, by setting equipment to be controlled to an electric lock installed in a door of a building and controlling permission or non-permission to open the door. In addition, it is possible to make the user be aware of having a smiling face giving a carefree feeling that the user is not allowed to boil water without having a smiling face by setting equipment to be controlled to an IH cooker and controlling permission or non-permission to use the IH cooker.

Furthermore, it is possible to make the user be aware of having a smiling face giving a carefree feeling that the user is not allowed to watch television programs without having a smiling face by setting equipment to be controlled to a television set and controlling permission or non-permission to use the television set. It is possible to realize various functions of equipment by setting a condition for access thereto to a smiling face such that equipment to be controlled is set to the engine of an automobile which is not allowed to start without a smiling face of the user, and equipment to be controlled is set to a PC which is not allowed to start without a smiling face of the user.

Modified Example and Others

A series of processes described above can be executed by hardware, and also by software. When the series of processes is executed by software, a program constituting the software is installed in a computer incorporated in dedicated hardware, or a general-purpose personal computer, or the like.

A program to be installed is provided by being recorded on an optical disc (CD-ROM (Compact Disc-Read Only Memory), a DVD (Digital Versatile Disc), or the like), or a removable medium 81 of FIG. 10 including a semiconductor memory, or the like. In addition, such a program may be provided through a wired or wireless transmission medium including a local area network, the Internet, or a digital broadcasting. A program can be installed in advance in the ROM 72 or the storage unit 78.

Furthermore, a program executed by a computer may be a program of which the process is performed in time series following the order described in the present specification, or may be a program of which the process is performed in parallel or at a necessary time point when it is called up, or the like.

An embodiment of the disclosure is not limited to the embodiments described above, and can be variously modified in the scope not departing from the gist of the disclosure.

Furthermore, the present disclosure can also be configured as below.

(1) An information processing device including a recognition unit which recognizes a facial expression of a user taken on a captured image, and a control unit which controls equipment to permit the user to use the equipment when the facial expression recognized by the recognition unit is a specific facial expression.

(2) The information processing device described in (1) above further including a capturing unit which captures an image of the user, in which the recognition unit recognizes a facial expression of the user taken on the image captured by the capturing unit.

(3) The information processing device described in (1) or (2) above in which the specific facial expression is a smile.

(4) The information processing device described in (1), (2), or (3) above further including an output unit which outputs information indicating the specific facial expression when the specific facial expression is recognized by the recognition unit and outputs information indicating a different facial expression from the specific expression when the facial expression that is not the specific expression is recognized by the recognition unit.

(5) The information processing device described in any one of (1) to (4) above, in which, when the user finishes using the equipment, the control unit controls the equipment to set non-permission to the user to use the equipment.

The present disclosure contains subject matter related to that disclosed in Japanese Priority Patent Application JP 2011-027680 filed in the Japan Patent Office on Feb. 10, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a recognition unit which recognizes a facial emotion expression of a user taken on a captured image;
a control unit which controls equipment to permit the user to use the equipment when the facial emotion expression recognized by the recognition unit is a specific facial emotion expression; and
an output unit which outputs information indicating the specific facial emotion expression when the recognition unit recognizes the facial emotion expression as being the specific facial emotion expression, and outputs information indicating a different facial emotion expression that is different from the specific facial emotion expression when the recognition unit recognizes the facial emotion expression as not being the specific facial emotion expression, wherein the outputted information indicating the different facial emotion expression is not a reproduction of the captured image, and
wherein the recognition unit, the control unit, and the output unit are each implemented via at least one processor.

2. The information processing device according to claim 1, further comprising:
a capturing unit which captures an image of the user,
wherein the recognition unit recognizes a facial emotion expression of the user taken on the image captured by the capturing unit, and
wherein the capturing unit is implemented via at least one processor.

3. The information processing device according to claim 1, wherein the specific facial emotion expression is a smile.

4. The information processing device according to claim 1, wherein, when the user finishes using the equipment, the control unit controls the equipment to set non-permission to the user to use the equipment.

5. An information processing method comprising:
recognizing a facial emotion expression of a user taken on a captured image;
controlling equipment to permit the user to use the equipment when the facial emotion expression recognized by the recognition unit is a specific facial emotion expression; and
outputting information indicating the specific facial emotion expression when the facial emotion expression is recognized as being the specific facial emotion expression, and outputting information indicating a different facial emotion expression that is different from the specific facial emotion expression when the facial emotion expression is recognized as not being the specific facial emotion expression,
wherein the outputted information indicating the different facial emotion expression is not a reproduction of the captured image.

6. A non-transitory computer-readable medium having embodied thereon a program, which when executed by a computer causes the computer to execute processes comprising:
recognizing a facial emotion expression of a user taken on a captured image;
controlling equipment to permit the user to use the equipment when the facial emotion expression recognized by the recognition unit is a specific facial emotion expression;
outputting information indicating the specific facial emotion expression when the facial emotion expression is recognized as being the specific facial emotion expression, and outputting information indicating a different facial emotion expression that is different from the specific facial emotion expression when the facial emotion expression is recognized as not being the specific facial emotion expression,
wherein the outputted information indicating the different facial emotion expression is not a reproduction of the captured image.

7. The information processing device according to claim 1, wherein the outputted information indicating the specific facial emotion expression is a visual notification of a positive recognition of the facial emotion expression being the specific facial emotion expression, and the outputted information indicating the different facial emotion expression is a visual notification of the facial emotion expression having not been recognized to be the specific facial emotion expression.

8. The information processing device according to claim 7, wherein the specific facial emotion expression is a smile.

9. The information processing device according to claim 1, wherein the information indicating the specific facial emotion expression and the information indicating the different facial emotion expression are each output respectively as an icon displayed to the user.

10. The information processing device according to claim 1, wherein the control unit switches a state of the equipment between a locked state and an unlocked state, based on the recognized facial emotion expression.

11. The information processing device according to claim 1, wherein when the facial emotion expression recognized by the recognition unit is the specific facial emotion expression, the control unit controls the equipment to permit the user to use the equipment by switching a state of the equipment from a locked state to an unlocked state.

12. The information processing device according to claim 1, wherein when the facial emotion expression recognized by the recognition unit is the specific facial emotion expression, the control unit controls a function of the equipment to be activated or accessible by the user.

13. The information processing device according to claim 12, wherein when the facial emotion expression recognized by the recognition unit is different from the specific facial emotion expression, the control unit controls the function of the equipment to be deactivated or inaccessible by the user.

14. The information processing device according to claim 1, wherein the outputted information indicating the specific facial emotion expression is not a reproduction of the captured image.

* * * * *